Aug. 12, 1941.  C. GERKEN  2,252,623
LIVESTOCK DRINKING DEVICE
Filed Feb. 13, 1940   2 Sheets—Sheet 1

Inventor
Conrad Gerken

By Clarence A. O'Brien
and Hyman Berman
Attorneys

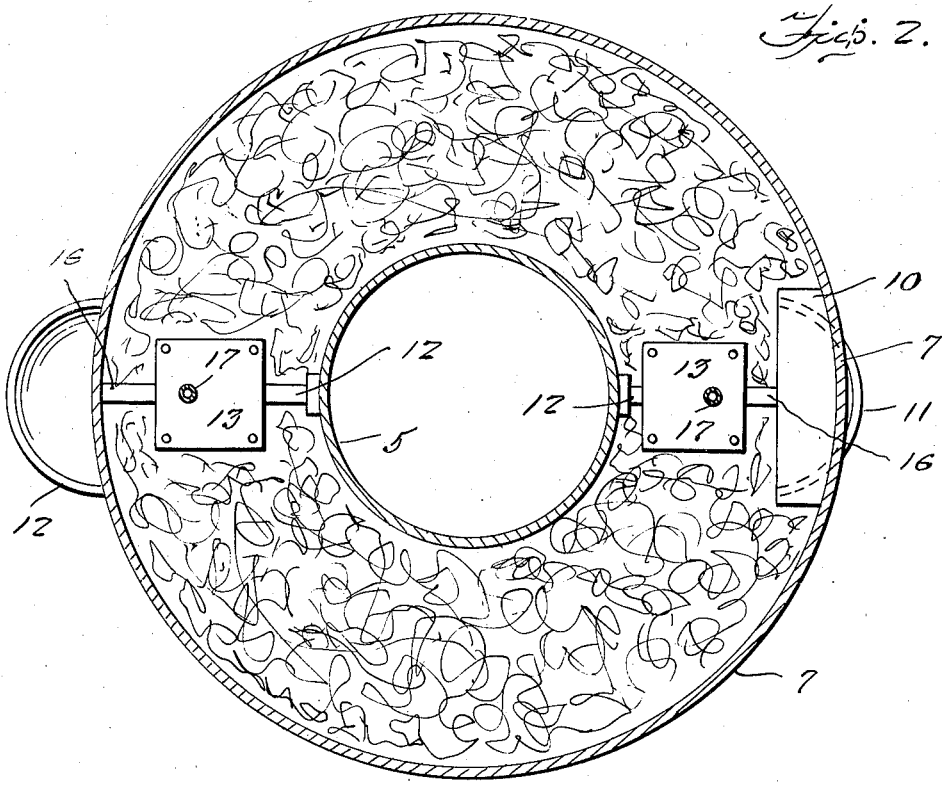
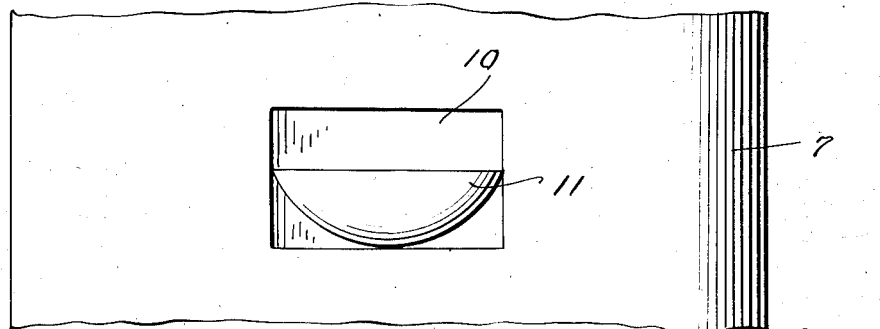

Patented Aug. 12, 1941

2,252,623

UNITED STATES PATENT OFFICE 2,252,623

LIVESTOCK DRINKING DEVICE

Conrad Gerken, West Point, Nebr.

Application February 13, 1940, Serial No. 318,768

1 Claim. (Cl. 119—73)

This invention relates to a livestock drinking device, and has for the primary object the provision of a device of this character which will provide an ample supply of clean, fresh drinking water as needed by the livestock and will automatically supply the drinking troughs thereof with water from a main tank protected against freezing as water is consumed by the livestock from the troughs, the main tank being fed with water from a supply as water is taken by the troughs to assure the livestock of water at all times.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a vertical sectional view illustrating a livestock drinking device constructed in accordance with my invention.

Figure 2 is a horizontal sectional view illustrating the same.

Figure 3 is a fragmentary side elevation illustrating one of the drinking troughs.

Figure 1:
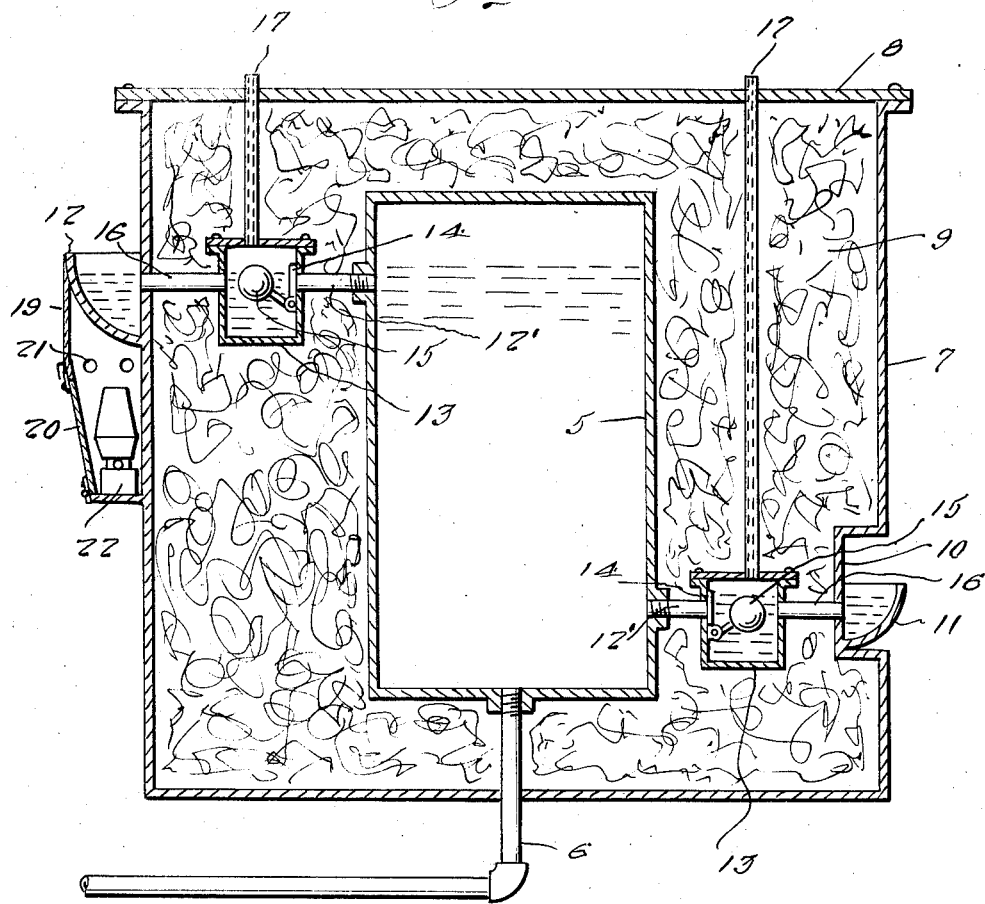
Figure 4:
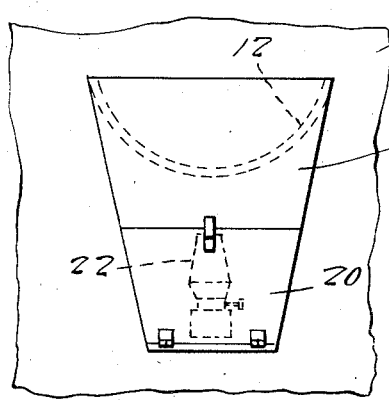
Figure 4 is a fragmentary side elevation illustrating a heating means for one of the drinking troughs.

Referring in detail to the drawings, the numeral 5 indicates a closed water supply tank having connected to the bottom thereof a water supply pipe 6. Surrounding the tank 5 in spaced relation thereto is a casing 7 having a removable cover 8. Insulating material 9 is arranged between the tank 5 and the casing 7 to protect the water in the tank from freezing.

The vertical wall of the casing 7 is provided with an indentation 10 in which is mounted a drinking trough 11. A drinking trough 12 similar to the drinking trough 11 is mounted on the casing opposite the trough 11 and in a plane thereabove. The indentation 10 or the wall thereof partly overlies the drinking trough 11 for the purpose of preventing foreign matter and the like from livestock from falling into the trough 11. The latter-named trough is preferably employed for watering hogs and similar animals.

Outlet pipes 12' are connected to the tank 5 and to float chambers 13 in which are located float operated valves 14. The floats of the valves are indicated by the character 15. Outlet pipes 16 connect the float chambers 13 with the troughs 11 and 12. The float operated valves automatically maintain a predetermined amount of water in the troughs at all times from the tank 5, the latter being replenished by water from the supply pipe 6 as the water enters the float chambers and the troughs.

Vent pipes 17 connect with the float chambers and extend upwardly through the cover 8 and are preferably arranged in alignment with the floats 15 so that a rod or similar device may be inserted through said vent tubes to engage the floats to unseat the valves 14 for the purpose of flushing the troughs 11 and 12.

A housing 19 is mounted on the casing 7 and partly encloses the trough 12 and has a door 20 and vent openings 21. A heating medium 22 is arranged in the housing for the purpose of heating the trough 12 to give warm drinking water when desired.

When the valves 14 are closed, air will be compressed in the upper end of the closed tank 5 above the uppermost valve by the incoming water from the source being under pressure so that the instant either of the valves 14 is opened, there will be a flow of water through the open valve to the trough to which it is connected.

A device of the character described in detail and shown in the drawings will be economical to manufacture and maintain in operation and may be readily set up for use at any place desired and will supply fresh clean drinking water to live stock at all times and may have the troughs thereof readily flushed to keep the device in a sanitary condition.

It is believed that the foregoing description, when taken in connection with the drawings will fully set forth the construction and advantages of this invention to those skilled in the art to which such a device relates, so that further detailed description will not be required.

Having thus described the invention, what I claim is:

In a livestock drinking device, a casing, drinking troughs arranged at different levels on the casing and exteriorly thereof, outlet pipes connected to the troughs and extending into the casing and supported thereby and each including sections spaced from each other, float chambers connecting said sections of the outlet pipes, a water tank arranged in the casing and connected to said outlet pipes for the support of said tank spaced from the casing, means connecting said tank to a constant liquid supply, float operated valves in the chambers for controlling flow of liquid from the tank to said chambers, vent pipes connected to said chambers and extending through the casing to permit liquid to enter said troughs from said chambers and rise to a level in the troughs corresponding to the level of the liquid in the chambers, said vent pipes being located in alignment with the floats of the float operated valves whereby an instrument may be passed through the vent pipes to engage the floats of the float operated valves for opening the float operated valves to flush out the troughs with water from the tank, and insulation in the space between the casing and tank and covering the tank, chambers and outlet pipes.

CONRAD GERKEN.